United States Patent [19]
Hulls

[11] Patent Number: 5,531,567
[45] Date of Patent: Jul. 2, 1996

[54] VERTICAL AXIS WIND TURBINE WITH BLADE TENSIONER

[75] Inventor: John R. Hulls, Point Reyes Station, Calif.

[73] Assignee: FloWind Corporation, San Rafael, Calif.

[21] Appl. No.: 262,476

[22] Filed: Jun. 20, 1994

[51] Int. Cl.⁶ .................................................. F03D 3/06
[52] U.S. Cl. .................. 416/87; 416/194; 416/227 A; 416/DIG. 8
[58] Field of Search .................. 416/87, 156, 194, 416/227 A, DIG. 8

[56] References Cited

U.S. PATENT DOCUMENTS

| | | | |
|---|---|---|---|
| 4,082,479 | 4/1978 | Rangi et al. | 416/227 AX |
| 4,281,965 | 8/1981 | Sternholm | 416/227 A |
| 4,329,116 | 5/1982 | Ljungstrom | 416/227 A |
| 4,500,257 | 2/1985 | Sullivan | 416/87 |
| 4,575,311 | 3/1986 | Wood . | |
| 4,624,624 | 11/1986 | Yum | 416/227 A |
| 4,808,074 | 2/1989 | South | 416/DIG. 8 |

FOREIGN PATENT DOCUMENTS

| | | | |
|---|---|---|---|
| 57-32076 | 2/1982 | Japan | 416/87 |
| 7606729 | 12/1977 | Netherlands | 416/87 X |

OTHER PUBLICATIONS

Loth et al., *Advanced Wind Turbine Design Study*, Research Proposal, West Virginia University. Jan. 1, 1990.
Loth, et al., "Advanced Wind Turbine Design Study On VAWT With Fully Articulated Blades Using Mechanical Harmonic Blade Pitch Modulation Improving Self–Starting, Low Wind Speed Speed Cut–in and Overspeed Control" submitted to Solar Energy Research Institute; Sep. 15, 1989.

*Primary Examiner*—Edward K. Look
*Assistant Examiner*—Michael S. Lee
*Attorney, Agent, or Firm*—Limbach & Limbach

[57] ABSTRACT

A Darrieus-type vertical axis wind turbine with tensioned blades is disclosed, along with various mechanisms for tensioning the blades. When the wind turbine is stationary in high wind conditions, the blades are tensioned to resist buckling. When the wind turbine is coming up to operational speed, or slowing down to a stop, the blades may also be tensioned to change the dynamic resonance characteristics of the rotor to avoid operation at resonant frequencies.

15 Claims, 8 Drawing Sheets

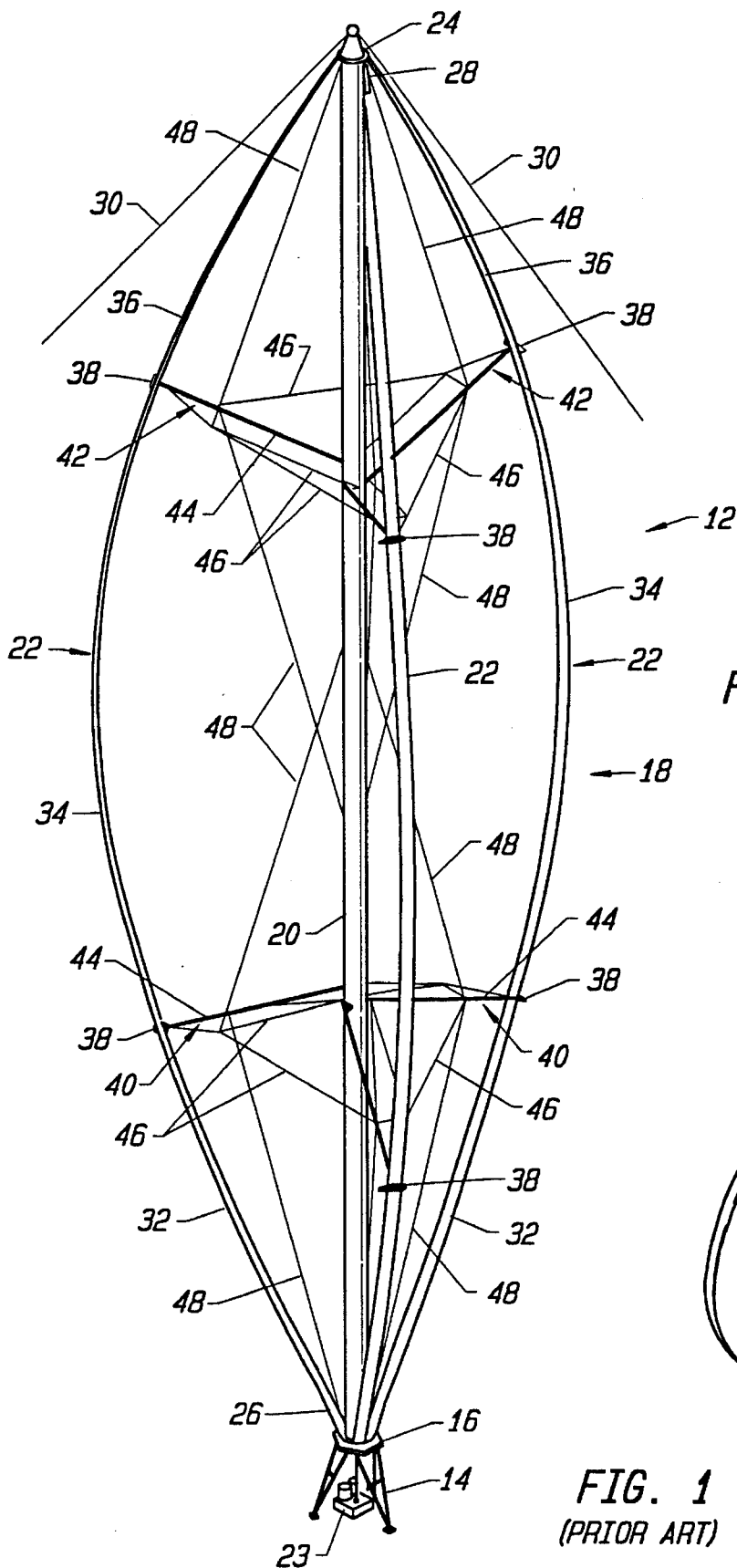
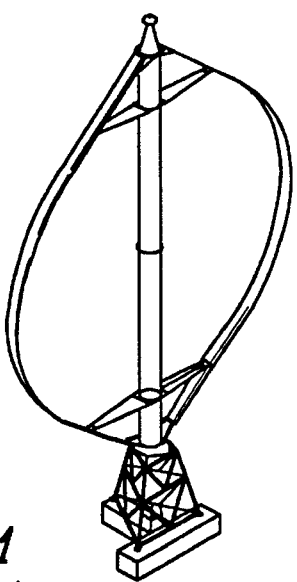
FIG. 2
FIG. 1
(PRIOR ART)

VERTICAL AXIS WIND TURBINE WITH BLADE TENSIONER

BACKGROUND OF THE INVENTION

1. Field of the Invention

This invention relates generally to Darrieus-type vertical axis wind turbines, and relates more particularly to a vertical axis wind turbine having means for tensioning the blades of the wind turbine to resist wind-induced buckling loads when parked and to avoid or dampen dynamic resonances when rotating.

2. Description of the Relevant Art

A Darrieus-type vertical axis wind turbine ("VAWT") typically has two curved blades joined at the ends to the top and bottom of a rotatable, vertical tower. The blades bulge outward to a maximum diameter about midway between the blade root attachments points at the top and bottom of the tower. See U.S. Pat. No. 1,835,018 to D. J. M. Darrieus for a basic explanation of such a VAWT. The rotatable, vertical tower with the blades attached will be referred to herein as a rotor or rotor assembly. A typical VAWT supports the bottom of the rotor on a lower bearing assembly, which in turn is elevated off the ground by a base. The rotation of the rotor is coupled to and drives an electrical generator, typically located in the base, that produces electrical power as the rotor rotates. The top of the rotor is supported by an upper bearing assembly that is held in place by guy wires or other structures. FIG. 1 of the drawings is an illustration of a typical prior art VAWT.

A key component of the VAWT are the blades, which interact with the wind to create lift forces that rotate the rotor and drive the generator. The blades typically have a symmetrical or semi-symmetrical airfoil shape in cross-section with a straight chord that is oriented tangential to the swept area of the turbine. The rotor rotates faster than the wind, and the wind generates lift forces on the blades that maintain rotation of the rotor. The lift forces are periodic because each blade goes through two phases of no lift per revolution when the blade is moving either straight up-wind or straight down-wind. In addition to the wind-generated lift forces, centrifugal forces also act on the blades.

A slender structure like a VAWT blade attached by its ends to a rotating axis tends to take the shape of a troposkein when the rotor rotates. A troposkein is the shape that a linearly-distributed mass like a skipping rope would take under centrifugal force when the rope is spun around an axis. Considering just centrifugal forces, the spinning rope takes the troposkein shape and is loaded in pure tension because it has negligible stiffness or resistance to bending. It is desirable for a VAWT blade to have a troposkein shape in order to minimize bending stresses and fatigue loads, but a practical problem is how to design a VAWT blade so that it is flexible enough to assume a troposkein shape yet rigid enough to withstand operating loads, including the significant loads that result from gravity.

In high velocity winds or wind gusts associated with storms, the winds may produce excessively high loads on the VAWT, in which case the rotor must be stopped and parked. When a VAWT is parked, the centrifugal force that maintains the troposkein shape of the blade is obviously not present, and the blade that is upwind is subject to wind loads that tend to buckle the blade inward toward the tower. In order to avoid structural damage, the blades must be strong enough to resist these buckling loads. The stiffness of a blade is directly related to its cross-sectional area; increasing the cross-sectional area of a blade will increase its stiffness and improve its resistance to buckling. Increasing the cross-sectional area of a blade, however, will detrimentally affect performance because of greater blade weight and aerodynamic drag and will also increase cost.

This tradeoff between buckling stiffness and performance is a significant factor in scaling-up the size of a VAWT, and may prevent a larger VAWT from achieving the same efficiencies as a smaller VAWT, or even being economical at all. Furthermore, the weight increase in the blades associated with increased stiffness also causes increased loads on other components, such as the tower and blade attachment structures, which must be increased in size and weight (and cost) in order to compensate.

Adequate buckling stiffness is also a constraint in designing VAWT's with higher height-to-diameter ratios ("H/D"), which may be advantageous to optimize energy recovery from a wind site, especially when coupled with an increased height. A VAWT with a relatively low H/D has blades that bulge outward to a greater degree than a VAWT having a higher H/D. The greater outward bulge of the low H/D VAWT imparts greater compressive strength and resistance to buckling than a relatively flat blade profile of the higher H/D VAWT, all else being equal. Therefore, increasing the H/D ratio weakens the buckling stiffness of a blade.

Another problem with scaling-up the size of a VAWT is that of resonant frequencies. Ideally, the VAWT operates at a frequency that is less than the lowest resonant frequency of the VAWT and its major components. By scaling-up the size of a VAWT, however, the larger and heavier structures of a larger VAWT will tend to have lower resonant frequencies than that of a smaller VAWT. If the resonant frequency of any component of a VAWT is within the operating frequency of the VAWT, then the structure will be subjected to potentially destructive resonant loads.

The competing design constraints of blade buckling and resonant frequencies make the design of larger VAWT's very difficult.

SUMMARY OF THE INVENTION

In accordance with the illustrated preferred embodiments, the present invention provides a Darrieus-type vertical axis wind turbine that includes a rotatable, vertical tower; one or more blades coupled to the tower for rotation therewith; one or more struts or other means for supporting an intermediate portion of each blade; and blade tensioning means for changing the state of tension of the blades.

One implementation of the blade tensioning means includes extendible struts that are extended to place the blade in tension. The extendible struts have a retracted position at which the blade assumes a troposkein shape during rotation. Extending the extendible struts from the retracted position to an extended position applies a tensile load on the blades. Varying the extension of the extendible strut between its retracted position and its extended position varies the tensile loads on the blades. A comparatively short stroke is required to place the blades under tension.

Preferably, the VAWT has two struts per blade. Either one or both of the struts can be extendible in order to implement blade tensioning. Preferably, each strut is attached to the blades at a pin joint, which allows the strut and the sections of the blade to rotate relative to each other. Using pin joints also permits each blade to be fabricated in three sections, which alleviates transportation problems associated with long, one-piece blades.

Another implementation of the blade tensioning device of the present invention involves mounting a linear actuator in series with the root attachment of each blade, preferably at the lower end. The linear actuator is retracted during operation to allow the blade to take a troposkein shape, and is extended to apply a tensile load to the blade.

Still another implementation of the blade tensioning device involves a sliding lower root attachment for the blades. The lower root attachment is moveable between a raised position, where the blades are free to take a troposkein shape, and a lowered position, which applies a tensile load to the blades.

The blade tensioning device of the present invention effectively solves the problem of buckling and gravity loads when the wind turbine is parked. When the rotor is parked in high-wind conditions, the blade tensioning means puts the blades in tension, or puts at least the upwind blade in tension. Since the upwind blade is in tension, wind loads will not cause compressive buckling failure. Also, gravity loads can be compensated so that the blades do not have to be self-supporting when parked.

The blade tensioning means also effectively solves the problem of structural resonances. When the rotor is accelerating up to the operational frequency from rest, or decelerating to a stop, the tension on the blades can be changed in order to vary the resonant frequencies of the rotor. The blade tensioning means puts a tensile load on the blades that avoids a given resonance condition, and then relaxes the tensile load when the resonant condition has passed. For example, if the VAWT passes through a resonant condition as it comes up to speed, the blade tensioning means applies a tensile load on the blades until a higher, non-resonant speed is achieved and then removes the applied tensile load to allow the blades to return to the optimum troposkein shape. The blade tensioning means can also operate in conjunction with a vibration sensor to dynamically dampen vibrations when detected.

A significant advantage of the blade tensioning device of the present invention is that it permits the use of flexible blades that readily conform to a troposkein shape, thereby minimizing operational stresses on the blade. The blade can be made flexible to conform to a troposkein shape under operating loads, without regard to the stiffness needed to withstand buckling loads.

Another significant advantage of the blade tensioning device of the present invention is that it allows blade designs to take advantage of the tremendous tensile strength and fatigue life of modern composite materials. As the loads on a blade are principally axial along the blade, the composite fibers of the blade can be aligned with the load, thus resulting in efficient use of the materials in their most advantageous condition. This also allows a significant reduction in cost and weight of the rotor and reduction in the size of other components, since blade weight contributes not only to compressive loads on the tower, but also to torsional loads on the base structure.

An important advantage of the present invention is that the total energy recovery from a wind-site can be increased through exercising the freedom that a blade tensioning device provides in designing Darrieus-type vertical-axis wind turbines. According to the present invention, VAWT's with high height-to-diameter ratios are structurally and economically feasible, thus allowing increased tower heights and increased swept areas without increasing swept diameters. Increased swept area is desirable because it increases wind energy capture on a per turbine basis. When total energy capture of a wind-site with multiple rows of wind turbines is considered, however, increasing swept area by increasing swept diameter may not increase energy capture because the increased swept diameters of the upwind turbines will generate larger wakes and thus decrease the wind energy supplied to downwind turbines. With the blade tensioning device of the present invention, existing sites can be upgraded by installing taller VAWTs of the same swept diameter, which increases energy capture of all turbines without starving the downwind turbines. Such an upgrade, which is made possible through the use of the blade tensioning device of the present invention, can optimize energy extraction from a given site and further reduce power generation costs.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a perspective view of a prior-art Darrieus-type vertical axis wind turbine.

FIG. 2 is a perspective view of a Darrieus-type vertical axis wind turbine according to the present invention.

DETAILED DESCRIPTION OF THE PREFERRED EMBODIMENTS

Figure 3:
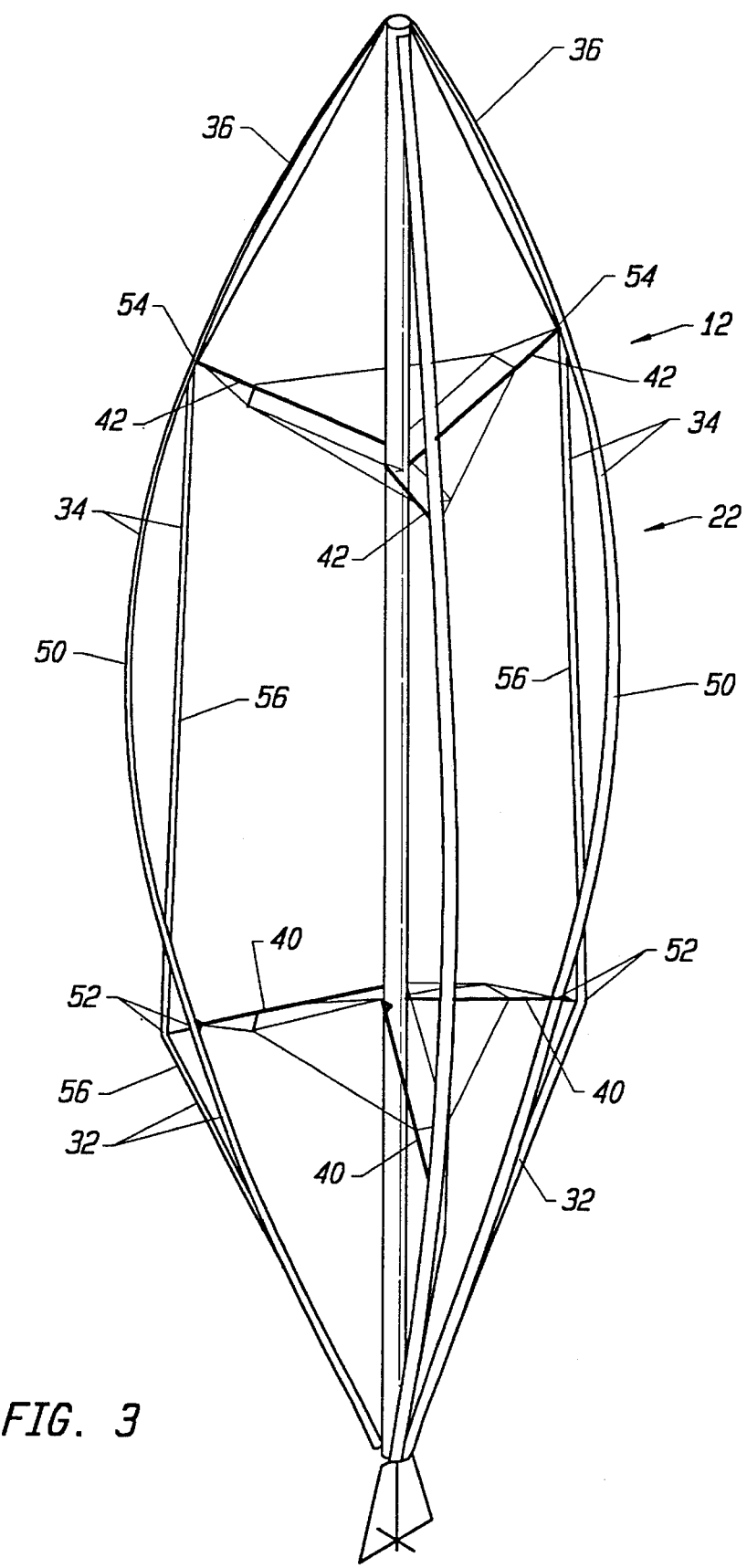
FIG. 3 is a perspective view of a Darrieus-type vertical axis wind turbine according to the present invention illustrating an operational mode, where the blades assume a troposkein shape, and a tensioned mode, where the blades are tensioned.

FIGS. 2 through 10 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The overall structure of a wind turbine 12 according to the present invention is illustrated in FIG. 2. The wind turbine 12 rests on a suitable foundation that supports a steel-framed base 14. The base 14 supports at its upper end a lower bearing assembly 16 upon which rotates a rotor assembly 18 that includes a tower 20 and multiple blades 22. The rotor assembly 18 is coupled through a gearbox (not shown) to twin generators 23 located within the base 14. Several hydraulic brakes (not shown) are mounted to the base 14 and, when activated, clamp onto a disk or other structure mounted to the bottom of the rotor assembly 18 to stop or slow the rotor when necessary.

The tower 20 is a rotatable, vertical structure supported at the bottom by the lower bearing assembly 16 and at the top by an upper bearing assembly 24. The bottom of the tower 20 includes a lower root assembly 26 that attaches the bottoms of the blades 22 to the tower, and an upper root assembly 28 that attaches the tops of the blades to the tower. The upper bearing assembly 24 is held in position by at least three guy wires 30 that extend down to anchors (not shown) at ground level. The tower 20 is preferably a tubular structure, but, alternatively, the tower 20 could be a truss or other rigid structure.

The shape of the blades 22 during rotation of the rotor, assuming that the blade tensioning device is not activated, is approximately a troposkein. Each blade is composed of three sections 32, 34, and 36 that are joined together by pin joints 38. The pin joints 38 permit the blade sections to rotate relative to each other and to the strut to accommodate the relative movement of the blade sections imparted by the blade tensioning device. The pin joints 38 will be discussed in further detail below with respect to FIGS. 5 and 6.

Each blade 22 is supported away from the tower 20 by a pair of horizontal struts 40 and 42. The struts 40 and 42 are located at about one-thirds of the tower height and about two-thirds of the tower height above the lower root assembly 26, respectively. Each strut is fastened at a distal end to the pin joint 38 of a blade 22 and is secured to the tower 20 at the other end. Preferably, each strut includes a tubular member 44 that is braced to the tower 20 and adjacent struts by cables 46. The construction details of the struts will be discussed in further detail below with respect to FIG. 7.

The struts 40 and 42 are braced above and below by cable stays 48. Each stay 48 is attached at one end thereof to the tower 20 and at the other end thereof to a strut 40 or 42 at a location distal from the tower. The distal attachment point is preferably about 75% of the strut length measured from the tower. There are two stays 48 bracing each strut 40 or 42, with one stay attached to the tower above the strut and the other stay attached to the tower below the strut. The stays 48 stiffen the struts 40 and 42 against compressive loads that occur on an upwind strut during parked conditions. The stays 48 also stiffen the tower 20 and permit resonance tuning of the rotor structures by varying the tension in the stays, both statically and dynamically.

In the preferred embodiment, three blades 22 are used, which reduces the structural and vibratory loading on the tower 20 as compared to an equivalent two blade design with the same total chord length. Distributing the total blade force among three blades reduces the peak force applied by any one blade and also smooths out the force impulses. While three blades is preferred, a VAWT with one or two blades or four or more blades is also within the scope of the present invention.

An exemplary design of a VAWT according to the present invention having a maximum power capacity of about one megawatt would have the following parameters.

| | |
|---|---|
| Rotor height | 96 meters |
| Rotor diameter | 30 meters |
| H/D | 3.2 |
| Swept area | 1919.2 square meters |
| Number of blades | 3 |
| Blade chord | 0.81 meters (32 inches) |

The cable stays 48 and strut braces 46 are preferably faired with a plastic extrusion to minimize drag. The stays and braces can be doubled and faired using the same approach.

The blades 22 are preferably a resin-fiber composite structure, and may be fabricated by pultrusion as disclosed in co-pending patent application Ser. No. 08/090,912, filed Jul. 12, 1993. The airfoil shape of the blades is preferably a symmetrical SNLA 2150 airfoil, but it could be asymmetric. The blades 22 preferably contain an internal box beam that provides much of the structural strength, and fairing to provide an external airfoil shape. Since the blade is principally loaded in tension resulting from centrifugal forces, the unit tension load is independent of blade cross section. In other words, the centrifugal forces are a direct function of the mass of the blade, so as the blade wall-thickness and weight are increased, the load carrying capacity also increases at the same rate. Thus the unit stresses remain constant and the primary design factor for the blade is its ability to resist lead/lag loads and torsional loads. This results in a blade that can be very light, thus minimizing the loads on the tower and the mass at the top of the rotor.

Figure 4:
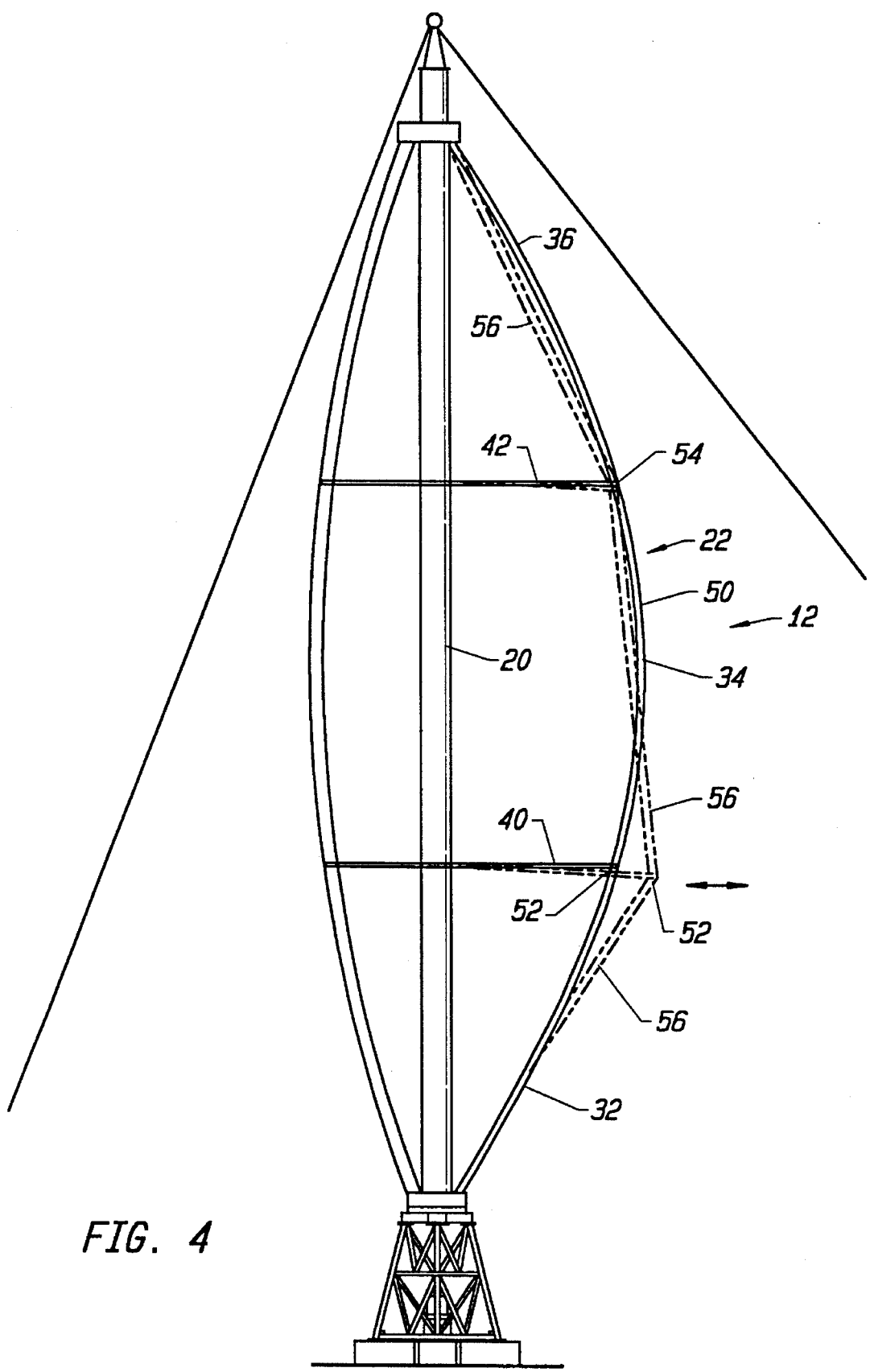
FIG. 4 is a side elevation view of a Darrieus-type vertical axis wind turbine according to the present. invention illustrating the operational mode and the tensioned mode shown in FIG. 3.

As shown in FIGS. 3 and 4, one implementation of the vertical-axis wind turbine 12 of the present invention has a blade tensioning device that comprises extensible lower struts 40. The upper struts 42 are fixed in length. The extensible struts 40 are positioned in a retracted position when the rotor is rotating, in which case the blades 22 assume a troposkein shape 50 (or a shape that approximates a troposkein). The retracted position of the extensible struts 40 places the lower pin joints 52 at the same radial distance as the upper pin joints 54.

The lower struts 40 are extensible to an extended position that places tension on the blades 22. When the lower struts are extended, the blade sections 32, 34, and 36 straighten out as shown by tensioned shape 56. In the movement between the troposkein shape 50 and the tensioned shape 56, the blade sections 32, 34, and 36 and struts 40 and 42 rotate slightly relative to each other about the pin joints 52 and 54 and the distal ends of the struts deflect downward slightly. The extension of the lower struts 40 and the radially outward movement of the lower pin joints 52 places the blade sections 32, 34, and 36 in tension. (For clarity in FIG. 4, only one blade is shown in the tensioned state 56.) The amount of tension on the blade section is a function of the amount of travel by the extensible lower struts 40. The blades 22 deflect slightly at the lower and upper root attachments 26 and 28, but that deflection is minimal. The root attachments may include pin joints if it is found desireable to eliminate bending loads caused by the root deflection.

Instead of using extensible lower struts with fixed-length upper struts, as illustrated in FIGS. 3 and 4, extensible upper struts with fixed-length lower struts could alternatively be used. Positioning the extension mechanism in the lower struts may be more desirable, however, because the lower struts are more accessible for servicing the extension mechanisms and for reducing mass at the top of the rotor.

Extending the extensible struts 40 and placing the blades 22 in a tensioned state 56 overcomes the problems associated with high wind buckling and gravity when the rotor is parked, and resonances when the rotor is accelerating or decelerating. The upwind blade will not buckle in compression due to wind loads when it is loaded in tension. Blade droop due to gravity when the rotor is parked can be eliminated by tensioning the blades. Resonant frequencies of the rotor structures can be varied by changing the tension on the blades to avoid destructive resonant vibrations when the rotor speed is passing through resonant frequencies of the untensioned rotor. Furthermore, lack of centrifugal stiffening of the blades during start-up can be counteracted by tensioning the blades.

Figure 5:
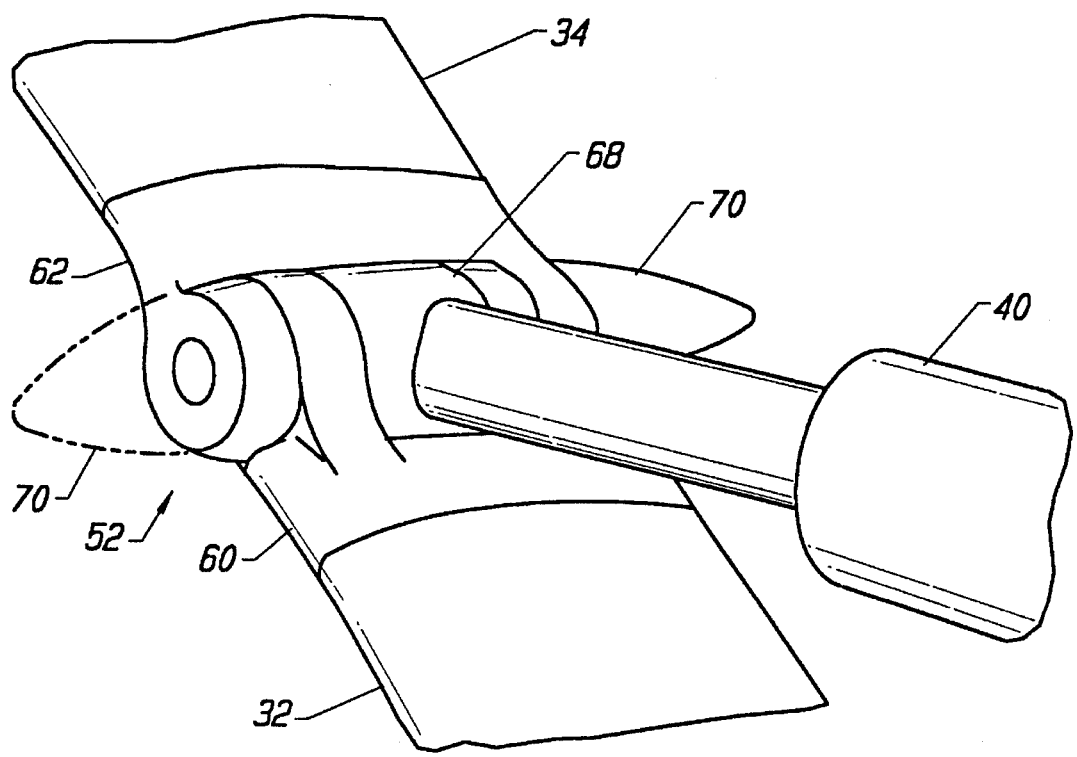
FIG. 5 is a perspective detailed view of a blade-strut joint for a Darrieus-type vertical axis wind turbine according to the present invention.
Figure 6:
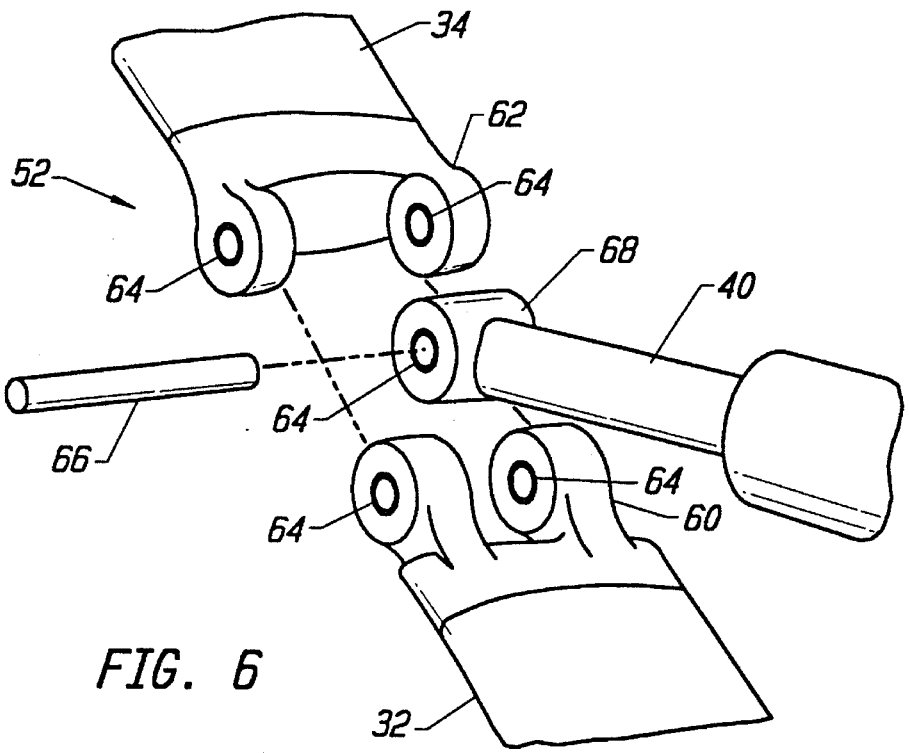
FIG. 6 is an exploded view of the blade-strut joint of FIG. 5.

FIGS. 5 and 6 illustrate the pin joints 52 that couple the struts 40 to the lower and intermediate blade sections 32 and 34. Pin joints 54 of the same construction are used to connect the upper struts 42 to the intermediate and upper blade sections 34 and 36. The blade sections 32 and 34 are terminated by clevises 60 and 62 having bushings 64 sized to accept a pin 66. The distal end of the strut 40 is terminated in an attachment 68 having a bushing 64. When the pin 66 is inserted into the bushings of the clevises 60 and 62 and the strut attachment 68, a pin joint is formed. A fairing 70 may be attached to the pin joint 52 to reduce aerodynamic drag. The clevises 60 and 62 and strut attachment 68 may be fabricated of cast steel using a lost foam process. The bushings are preferably fabricated from a PTFE/composite material available from, Garlock Bearings, Inc. of Thorofare, N.J. under the trademarks GAR-MAX and GAR-FIL. The bushings provide a low friction, low stickage joint, but have adequate bearing capacity to withstand the loads on the joint.

Figure 7:
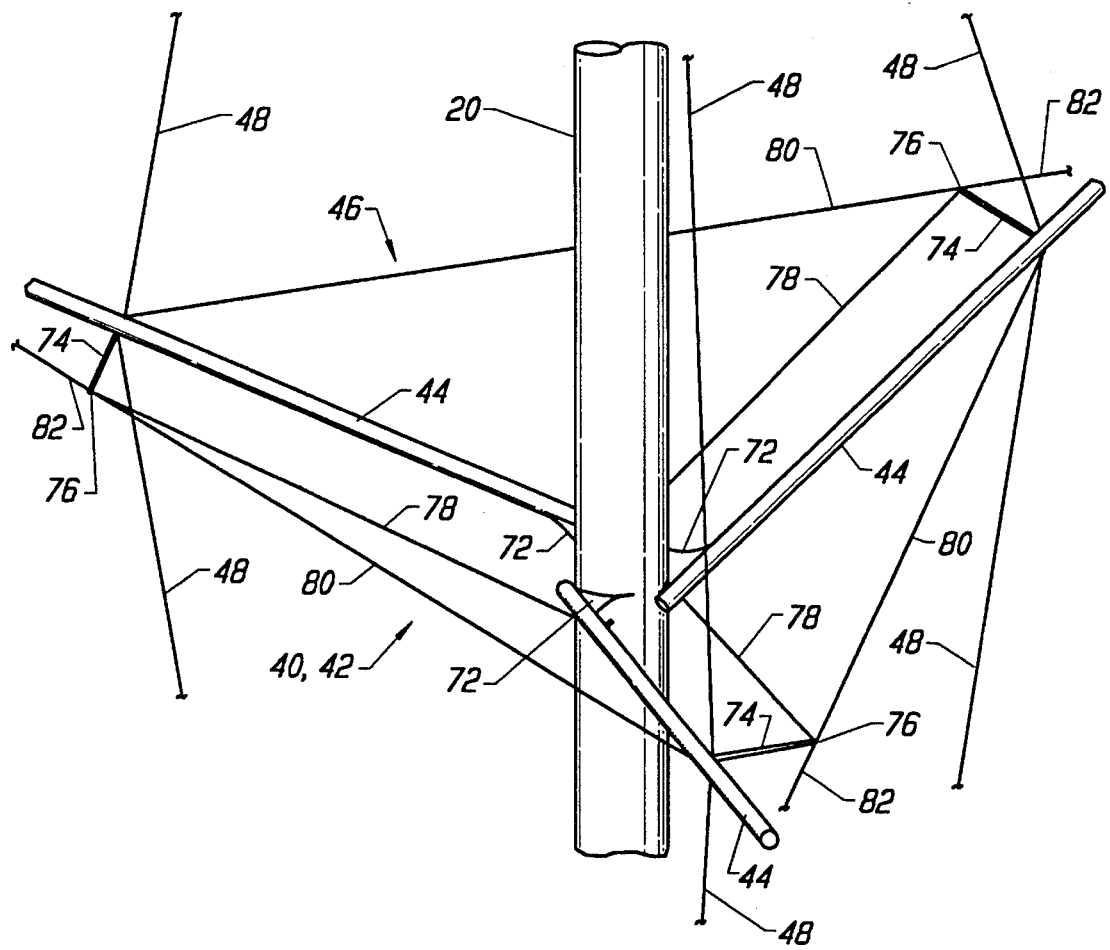
FIG. 7 is a perspective detailed view of a strut structure for a Darrieus-type vertical axis wind turbine according to the present invention.

FIG. 7 illustrates the struts 40 and 42 used in the vertical-axis wind turbine 12 of the present invention. Three tubular members 44 are attached at a proximal end to the tower 20 by brackets 72. A distal end of the tubular members 44 is attached to a pin joint as shown in FIGS. 5 and 6. In the case of the non-extensible upper struts 42, the tubular member 44 is fixedly attached to the attachment 68 (FIG. 6) at the distal end of the strut. In the case of the extensible lower struts 40, the tubular member contains a linear actuator (not shown) that has an extensible end that is terminated in the attachment 68 (FIG. 6) that attaches the strut to the pin joint 52. The linear actuator is preferably mounted inside the tubular member. The linear actuator may be an electrically driven jackscrew, such as a model MM 1730 Transmag linear actuator from Magnetic Elektromotoren of Liestal, Switzerland and Maulburg Germany. In the one megawatt VAWT described above, the retracted length of the extensible strut is 458 inches, and the extended length is an additional 73.5 inches.

In addition to the tubular member 44, the strut also includes a drag brace 46 and a king post 74 to help transfer lead/lag loads from a blade to the tower and to adjacent blades. The king post 74 projects horizontally at a right angle from the tubular member 44 at a distance from the tower 20 equal to about 75% of the length of the tubular member. The king post 74 projects outward from the tubular member 44 to a distal end 76 that serves as an attachment point for cables of the drag brace. The drag brace 46 includes cables 78 that extend between the distal ends 76 of the king posts 74 and the tower 20, cables 80 that extend between the distal ends of the king posts and an adjacent strut, and cables 82 that extend between the distal ends of the king posts and the distal end of the tubular member. One end of cable 78 is pretensioned against bracket 72 with Bellville washers or other spring and damper device to insure the correct pre-load on the cables and to allow resonant tuning. It should be noted that the weight of a pin joint is carried by the tubular member 44, but the centrifugal force due to the weight of the pin joint tends to offset the resultant compression loads from the transmission of aero torque from the blades.

FIG. 7 also shows that the stays 48 are attached to the struts 40 and 42 at the root ends of the king posts 74.

Figure 8:
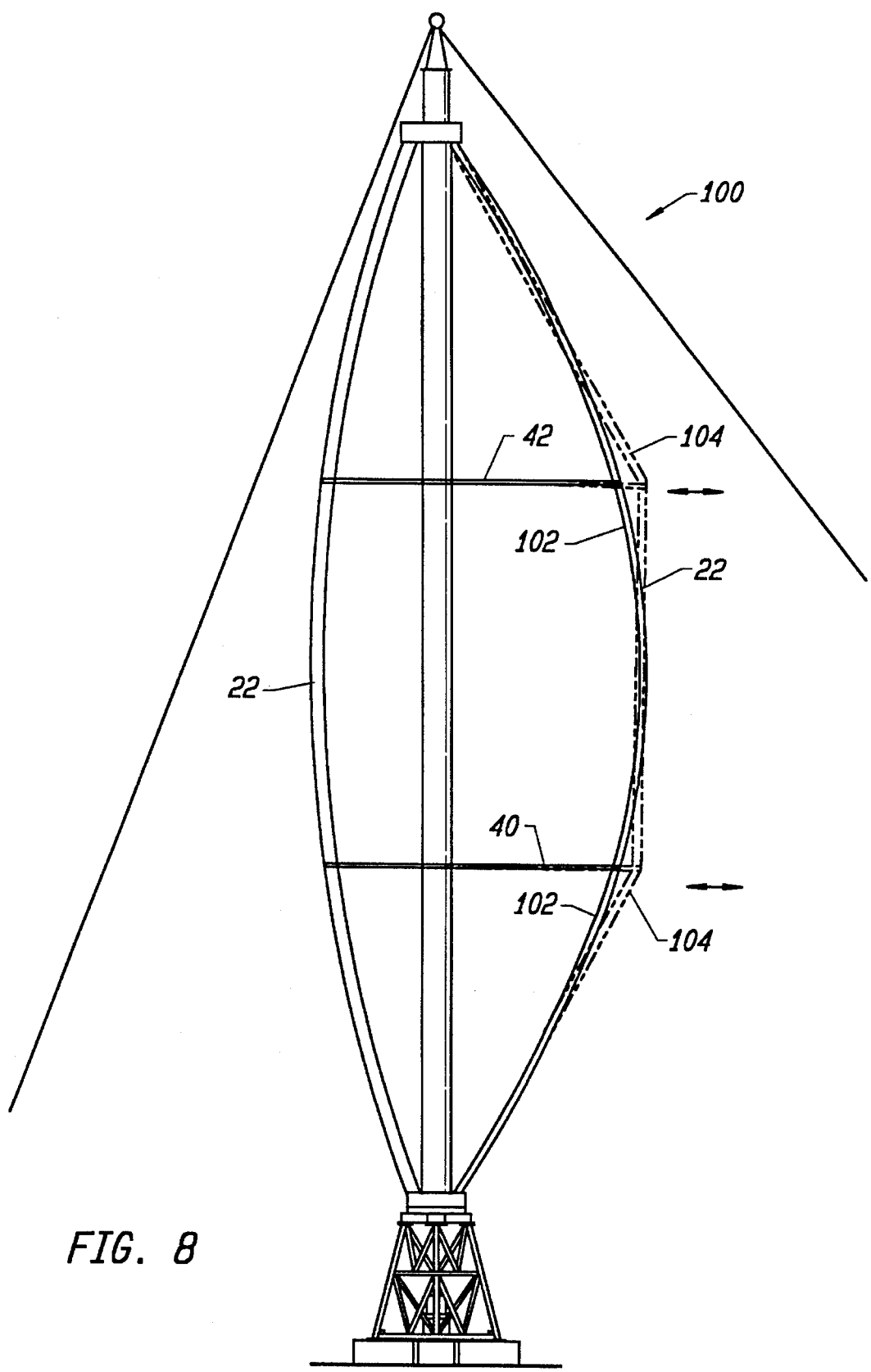
FIG. 8 is a side elevation view of a Darrieus-type vertical axis wind turbine having an alternative blade-tensioning device according to the present invention.
Figure 9:
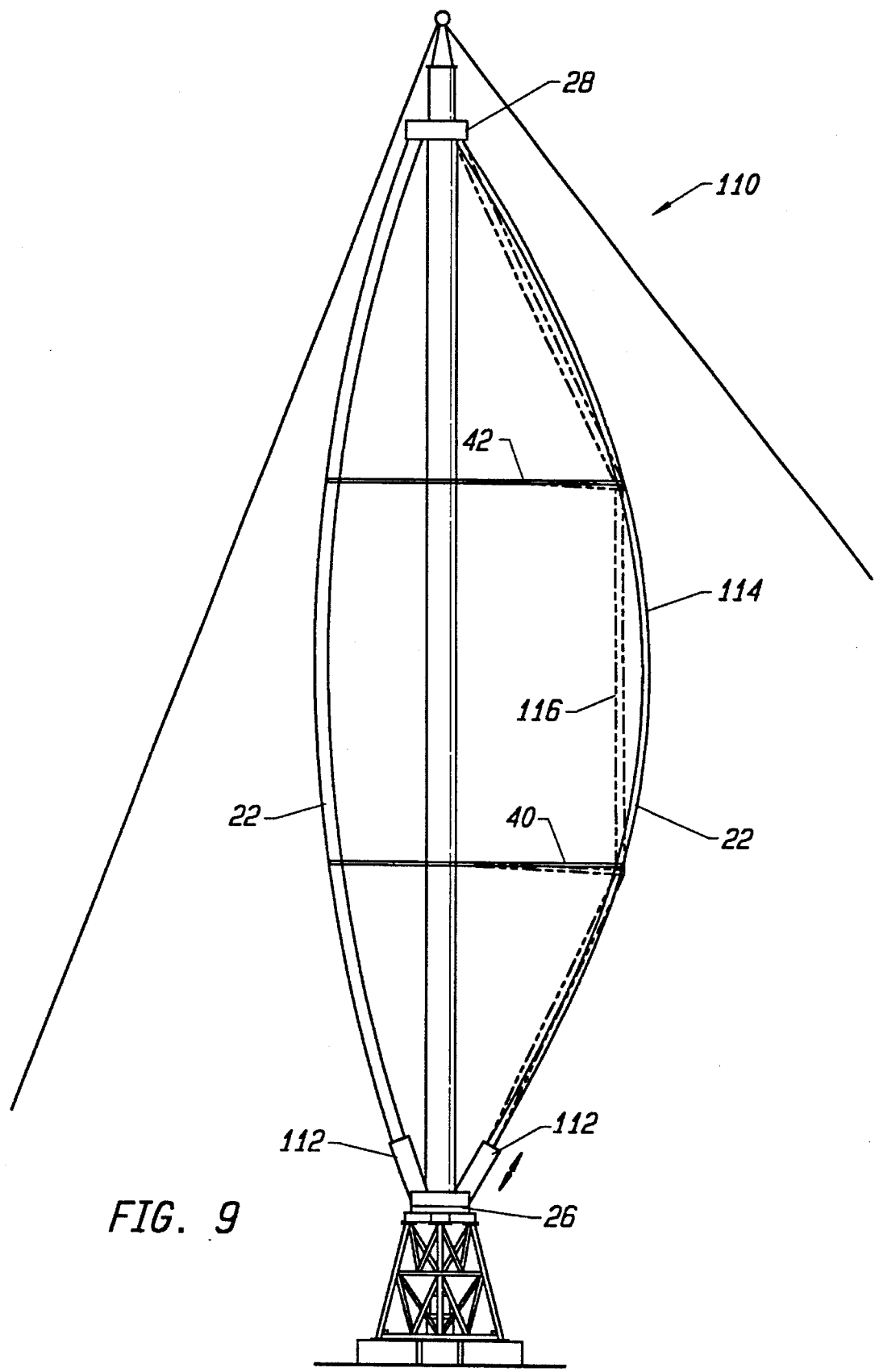
FIG. 9 is a side elevation view of a Darrieus-type vertical axis wind turbine having another alternative blade-tensioning device according to the present invention.
Figure 10:
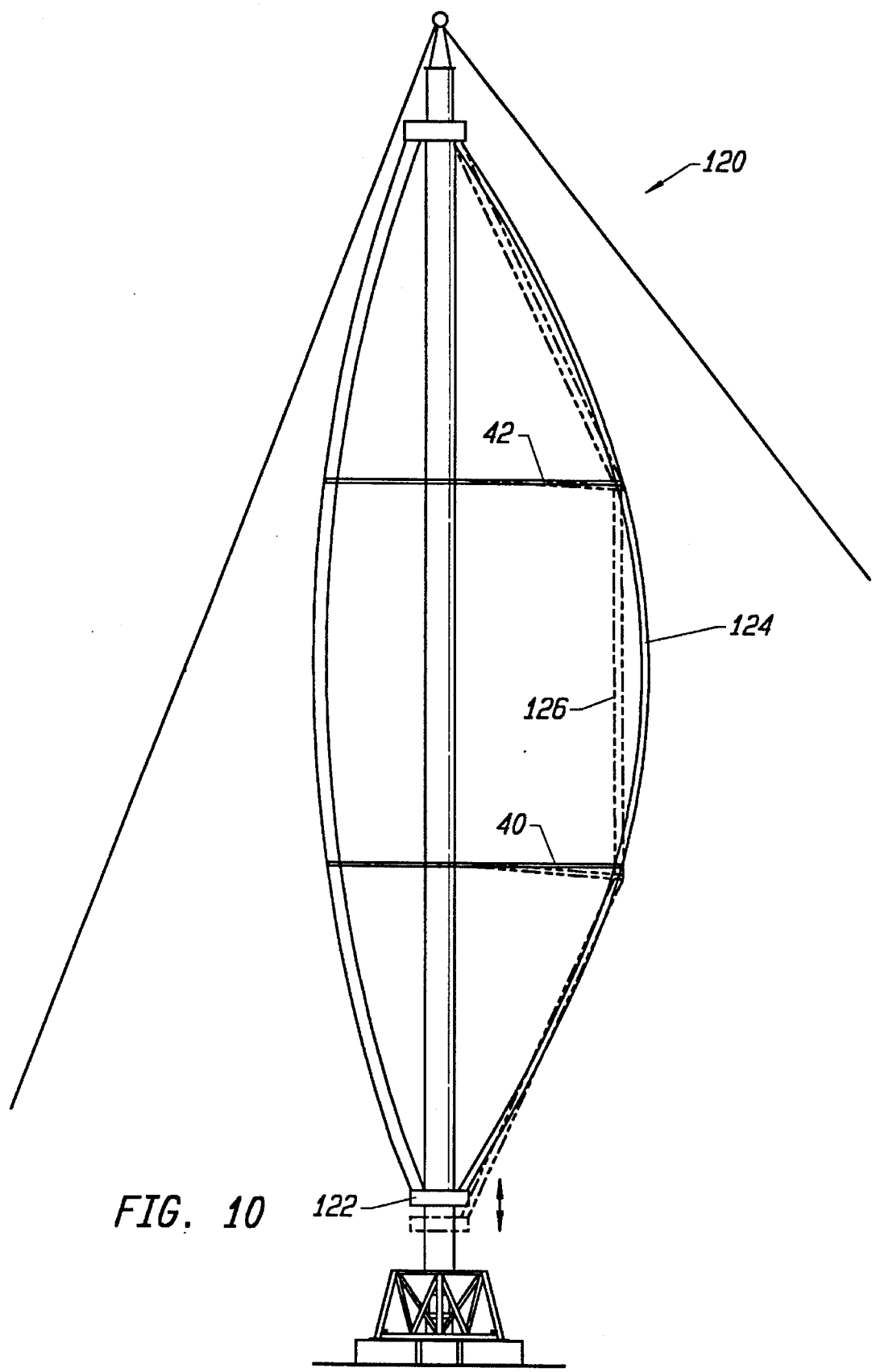
FIG. 10 is a side elevation view of a Darrieus-type vertical axis wind turbine having still another alternative blade-tensioning device according to the present invention.

FIGS. 8–10 illustrate alternative implementations of a blade tensioning device according to the present invention. FIG. 8 illustrates a VAWT 100 according to the present invention in which all struts 40 and 42 are extensible. This increases the number of linear actuators required, but requires shorter travel for the actuators. FIG. 8 shows VAWT 100 with one blade in both a troposkein shape 102 and a tensioned shape 104 (dashed lines). Just as described above, extending the struts places tension on the blades 22.

FIG. 9 illustrates a VAWT 110 according to the present invention in which all struts 40 and 42 are fixed in length, and the blade tensioning device is located at the base of the rotor. In this case, a linear actuator 112 is coupled in series between the lower root of each blade 22 and the lower root attachment 26. FIG. 9 shows VAWT 110 with one blade in both a troposkein shape 114 and a tensioned shape 116 (dashed lines). The linear actuators 112 move between an extended position, in which the lower root of the blade is raised upward and tension is removed from the blade, and a retracted position, in which the lower root is pulled downward to place tension on the blade. The struts 40 and 42 deflect downward when the blades are tensioned. Alternatively or in addition to lower root actuators, linear actuators could be placed in series with the upper root attachment 28, but that would undesirably increase the weight at the top of the tower 20.

FIG. 10 illustrates a VAWT 120 according to the present invention in which the struts 40 and 42 are fixed in length, and the blade tensioning device is a movable lower root attachment 122. A linear actuator moves the lower root attachment 122 between a raised position, in which the lower root attachment is raised upward and tension is removed from the blades, allowing them to take a troposkein shape 124, and a lowered position, in which the lower root attachment is pulled downward to place tension on the blades, as shown by dashed lines 126. The struts 40 and 42 deflect downward when the blades are tensioned. Alternatively or in addition to a movable lower root attachment, the upper root attachment could be moveable, but that would undesirably increase the weight at the top of the tower 20. Also alternatively, the tower height could be adjustable, in which case an extended height would put tension on the blades.

From the above description, it will be apparent that the invention disclosed herein provides a novel and advantageous blade tensioning device for a Darrieus-type vertical-axis wind turbine. The foregoing discussion discloses and describes merely exemplary methods and embodiments of the present invention. As will be understood by those familiar with the art, the invention may be embodied in other specific forms without departing from the spirit or essential characteristics thereof.

Alternative devices may fall within the scope of the present invention, even if not set forth in detail herein. For example, a VAWT without struts could be tensioned if there is a structure such as a snubber that would support an intermediate portion of the blades away from the tower and thus permit movement of the blade attachments to cause a tensile load on the blades. Linear actuators other than a jackscrew could be used, such as hydraulic or pneumatic cylinders. Alternatively, a two positioning latching mechanism could be used to provide the travel for the extensible struts or other movable blade attachment means.

Accordingly, the disclosure of the present invention is intended to be illustrative, but not limiting, of the scope of the invention, which is set forth in the following claims.

What is claimed is:

1. A Darrieus-type vertical axis wind turbine comprising:

a vertical tower supported for rotation;

one or more blades each coupled to the tower for rotation therewith, wherein each blade has an upper root coupled to the tower by a blade root attachment means proximate the top of the tower and a lower root coupled to the tower by a blade root attachment means proximate the bottom of the tower;

blade supporting means for supporting an intermediate portion of each blade away from the tower; and blade tensioning means for changing the tensile forces on a blade.

2. A wind turbine as recited in claim 1 wherein the blade supporting means includes a strut coupled between each blade and the tower.

3. A wind turbine as recited in claim 2 wherein the blade supporting means includes two struts coupled between each blade and the tower.

4. A wind turbine as recited in claim 2 wherein the blade tensioning means includes an extensible strut having one end coupled to the tower at a tower attachment point and another end coupled to a blade at a blade attachment point, wherein the extensible strut includes means for extending the distance between the tower attachment point and the blade attachment point.

5. A wind turbine as recited in claim 4 wherein the extensible strut includes a hollow member having a linear actuator housed therein that provides the means for extending the distance between the attachment points.

6. A wind turbine as recited in claim 2 wherein the blade tensioning means includes two extensible struts each having one end coupled to the tower at a tower attachment point and another end coupled to a blade at a blade attachment point, wherein each extensible strut includes means for extending the distance between the tower attachment point and the blade attachment point.

7. A wind turbine as recited in claim 2 further comprising a three-way pinned joint coupling each strut to upper and lower sections of a blade, wherein the three-way pinned joint permits rotation of the strut and the two blade sections relative to each other.

8. A wind turbine as recited in claim 2 wherein each strut includes a tube fastened to the tower at one end thereof and extending toward and coupled to a blade at the opposite end thereof, and further includes a drag brace coupled between the strut, the tower, and adjacent struts.

9. A wind turbine as recited in claim 2 further comprising stays coupled between the tower and the struts, wherein each strut is attached at a location distal from the tower to one end of an upper stay and one end of a lower stay, and wherein the opposite end of the upper stay is attached to the tower at a point above the strut and the opposite end of the lower stay is attached to the tower at a point below the strut.

10. A wind turbine as recited in claim 1 wherein the blade tensioning means includes a linear actuator coupled in series with each blade between the blade root and an associated blade root attachment, wherein the linear actuator includes means for extending the distance between the blade root and the blade root attachment.

11. A wind turbine as recited in claim 1 wherein the blade tensioning means includes means for changing the separation distance between the upper and lower blade root attachments.

12. A wind turbine as recited in claim 11 wherein the means for changing the separation distance between the root attachments includes means for moving the lower blade root attachment means relative to the tower.

13. A wind turbine as recited in claim 1 wherein the blade tensioning means includes means for tensioning all blades of the wind turbine.

14. A Darrieus-type vertical axis wind turbine comprising:

a vertical tower supported for rotation;

three blades each coupled to the tower at the top and bottom thereof, wherein each blade includes three sections joined by two intermediate pin joints;

three pairs of horizontal struts coupled between the tower and the pin joints of the blades, wherein each pair of struts is coupled between one blade and the tower, wherein one strut of each pair of struts is an extensible strut that includes means for extending the distance between the tower and the pin joint attachment to apply a tensile load to the blade.

15. A Darrieus-type vertical axis wind turbine comprising:

a vertical tower supported for rotation;

one or more blades each coupled to the tower for rotation therewith, wherein each blade has an upper root coupled to the tower by a blade root attachment means proximate the top of the tower and a lower root coupled to the tower by a blade root attachment means proximate the bottom of the tower;

blade supporting means for supporting an intermediate portion of each blade away from the tower; and blade tensioning means for applying a tensile force to the blade.

* * * * *